March 6, 1962
B. W. HOTTEN
3,024,274
AMIDES OF CYCLIC DIAMINEALKYLENECARBOXYLIC ACIDS
Filed March 18, 1959
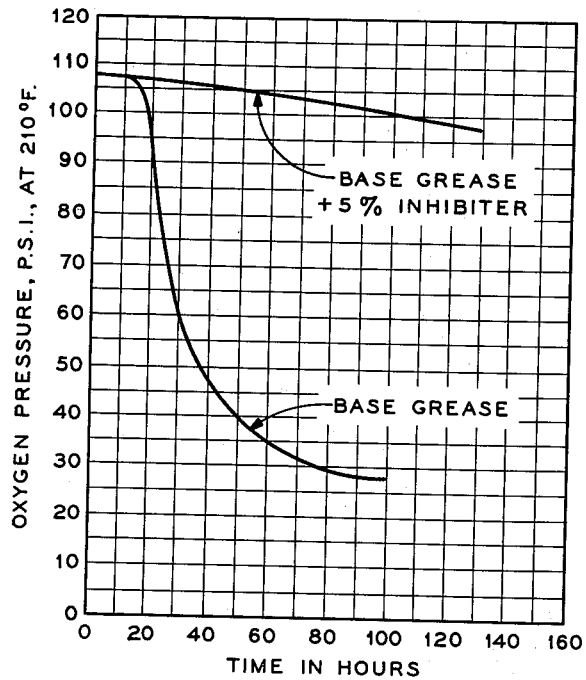
INVENTOR
BRUCE W. HOTTEN
BY

United States Patent Office 3,024,274
Patented Mar. 6, 1962

3,024,274
AMIDES OF CYCLIC DIAMINEALKYLENE-
CARBOXYLIC ACIDS
Bruce W. Hotten, Orinda, Calif., assignor to California Research Corporation, San Francisco, Calif., a corporation of Delaware
Filed Mar. 18, 1959, Ser. No. 800,210
2 Claims. (Cl. 260—514)

This invention relates to new compositions of matter. More specifically, the invention relates to new compositions of matter which are particularly useful as rust inhibitors and oxidation inhibitors for lubricants, e.g., greases, at high temperatures.

This application is a continuation-in-part of Hotten patent application Serial No. 683,156, filed September 10, 1957, which, in turn, is a division of Hotten United States Patent 2,954,342.

Modern usage and increasingly severe requirements necessitate, among other things, the use of rust inhibitors and oxidation inhibitors for lubricating oil compositions, for example, greases, which are capable of performance at high temperatures. Many inhibitors are available, e.g., tertiary butyl phenols and hydroquinone, which are effective as oxidation inhibitors but which are volatile and evaporate from lubricating oil compositions at high temperature.

It is an object of the present invention to provide new compounds which are effective as emulsifying agents, effective for inhibiting rust formation, and inhibiting oxidation of lubricants, particularly greases, at high temperatures.

This and other objects of the invention will be apparent from the ensuing description and the appended claims.

In accordance with the present invention, I have discovered the new compounds, amides of cyclicdiamine-alkylenecarboxylic acids. These new compounds, which are useful as oxidation inhibitors in lubricating compositions, as emulsifying agents, rust inhibitors, etc., can be represented by the formula:

FORMULA A

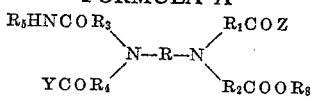

wherein R is a cyclic substituted or unsubstituted, saturated or unsaturated hydrocarbon radical containing from 6 to 14 carbon atoms; $R_1$, $R_2$, $R_3$ and $R_4$ are alkylene radicals containing 1 or 2 carbon atoms (i.e., methylene, ethylene and ethylidene radicals); Y is a radical selected from the group consisting of —$OR_8$ and —NH—$R_6$; Z is a radical selected from the group consisting of —$OR_8$ and —NH—$R_7$; $R_5$, $R_6$ and $R_7$ are saturated or unsaturated hydrocarbon radicals containing from 12 to 22 carbon atoms, e.g., alkyl radicals containing from 12 to 22 carbon atoms; and $R_8$ represents hydrogen, an ester radical or a metal.

The new compounds described herein can be prepared by reacting a carboxylic acid with a cyclic diamine to form the desired cyclicdiaminetetraalkylenecarboxylic acid (e.g., cyclidiaminetetraacetic acid), which in turn is reacted with an aliphatic primary or secondary amine to form the cyclicdiaminetetraalkylenecarboxylic acid derivative (e.g., mono-, di-, or triamides of cyclicdiamine-tetraalkyleneacetic acid).

The following specific examples will serve further to illustrate the practice and advantages of the invention:

*Example 1.*—*Trioctodecylamide of Cyclohexane-diamine Tetraacetic Acid*

A mixture of 21 grams of 1,2-cyclohexanediaminetetra-acetic acid and 32.4 grams octadecylamine (i.e., "Armeen 18D" was heated at 100–200° C. for a period of three hours. The reaction product had a melting point of 64° C., a nitrogen content of 6.38% (theory=6.20) and an acid number of 36 (mgs. KOH per gram sample). "Armeen 18D" is an octadecylamine sold by the Armour Company, and containing 98% octadecylamine.

*Example 2.*—*Amide of Alkylene Diamine Tetraacetic Acid*

50 grams of ethylenediaminetetraacetic acid and 156 grams of "octadecylamine" were reacted by mixing and heating the reactants to 400° until evolution of water had ceased. The reaction which occurred was as follows:

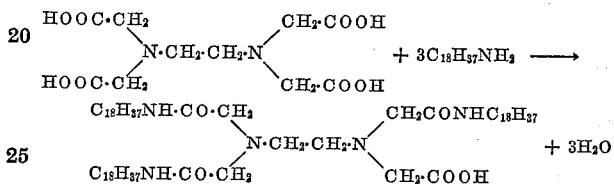

The crude product was recrystallized from ethyl alcohol to yield a cream-colored solid melting at 90–96° F. Analysis proved that only three of the carboxyls of ethylenediaminetetraacetic acid reacted. Apparently steric hindrance or some other factor renders the fourth carboxyl difficult to react with the amine.

The "octadecylamine" used herein was a commercial preparation known as "Armeen HT," sold by the Armour Company, Chicago, Illinois, and containing 25% hexadecylamine, 70% octadecylamine, and 5% octadecenylamine. 85% of this mixture consists of n-primary amines.

*Example 3.*—In testing the utility of these new compounds as oxidation inhibitors, five grams of the recrystallized product of Example 2 were incorporated in 95 grams of a grease comprising approximately 88 parts by weight of a solvent refined California paraffin base oil having a viscosity of 480 SSU at 100° F., the oil being thickened with 12% by weight of lithium stearate. The added inhibitor (product of Example 2) was incorporated by warming the grease to 200° F. and stirring in the inhibitor with a spatula. The inhibitor dispersed readily in the grease to form a stable dispersion.

The base grease (no inhibitor) and the same grease compounded with the new product of Example 3 as described above, were subjected to ASTM D942-50 Oxidation Test. Results of the test are set forth in the graph illustrated in the accompanying drawing in which abscissae represent time in hours and ordinates represent oxygen pressure in pounds per square inch. The test was carried out at the standard temperature of 210° F. The initial pressure in both cases was approximately 108 p.s.i.

It will be noted that in 100 hours the pressure dropped only 7 pounds in the case of the inhibited grease whereas in the same period of time in the case of the base grease the pressure dropped 81 pounds.

It will be apparent from the above teachings that the cyclicdiamines, the carboxylic acids and the aliphatic amines may be varied within suitable limits. Examples of suitable alkylenediamines, carboxylic acids and aliphatic amines which may be employed as components of the new compounds of the invention are set forth in the table below:

TABLE II

| Cyclicdiamine-diamines of— | Carboxylic acids | Aliphatic amines |
|---|---|---|
| Benzene | CH·COOH | Dodecylamine. |
| Alkylsubstituted benzene | Acetic acid | Tetradecylamine. |
| Naphthalene | $CH_3 \cdot CH_2 \cdot COOH$ | Hexadecylamine. |
| Decalin, etc. | Propionic acid[1] | Octadecylamine. Eicosylamine. Docosylamine. |

[1] In the compounds of this invention, the amino nitrogen may be attached to the $\alpha$ or the $\beta$ carbon atom.

Referring to Table II and to the type formula hereinabove, R may be derived from any of the diamines listed in the left-hand column; $R_1CO$—, $R_2CO$—, $R_3CO$—, and $R_4CO$— may be derived from any of the carboxylic acids in the middle column; and $R_5$ and $R_6$ and $R_7$ may be derived from any of the amines listed in the right-hand column. When $R_8$ of the above formula is an ester radical, such ester radical may be derived from monohydric alcohols having from 1 to 6 carbon atoms; for example, methanol, ethanol, and normal and branched-chain propanols, butanols, hexanols, etc.

When $R_8$ is a metal, such a metal can be an alkali metal or an alkaline earth metal; for example, sodium, potassium, lithium, barium, calcium and strontium.

The new compounds described herein also include those wherein R in Formula A hereinabove represents the following:

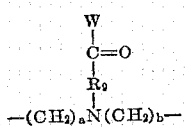

wherein W is the same as Y, or Z, of the above formula A; $R_9$ is the same as $R_1$, $R_2$, $R_3$ or $R_4$; and $a$ and $b$ are numbers having values of 2 to 3.

*Example 4.—Reaction Product of Diethylenetriaminepentaacetic Acid and Octadecylamine*

A mixture of 98 grams of diethylenetriaminepentaacetic acid and 135 grams of octadecylamine (i.e., "Armeen 18D") was heated at 130° C. to 160° C. for one hour. Nine grams of water were recovered during the reaction. The recovered product had a melting point of 106 to 114° C.; an acid number of 132; and a nitrogen content of 8.02%. (Theory=8.25 for a diamine; 7.55% for a triamine and 7.08% for a tetraamine).

It is understood that these new compounds include not only the triamides of the polycarboxylic acid amines, but also the monoamides, the diamides, and the tetraamides.

In the use of these new compounds of the invention as oxidation inhibitors in greases, small amounts, generally between about 2% and 10% by weight, preferably about 2% to 6% by weight based on the finished grease, can be used. However, when such compounds are used in unthickened lubricating oils, amounts as low as 0.1% by weight may be used.

As oxidation inhibitors, these compounds may be used in various types of lubricants, including lubricating oils and thickened lubricating oils such as greases. They are preferably used in greases. Representative base oils in which these new compounds may be used include petroleum lubricating oils (naphthenic, paraffinic and mixed base oils); alkylene oxide polymers such as polypropylene oxide polymers; di-esters such as diisoamyl adipate, di-2-ethylhexyl azelate and di-2-ethylhexyl adipate, etc.

Where the oils are thickened to form grease, the thickeners may be of various types, e.g., conventional soap-type thickeners such as sodium, lithium and calcium stearates; salts of dibasic acid-diamine condensation products such as the product of condensing a molar excess of adipic acid with hexamethylene diamine, partially neutralizing the terminal carboxyls with n-decylamine, then forming the lithium or sodium salt (see Dixon U.S. Patent No. 2,752,312, entitled "Polyamide-Polyamate Thickened Greases," filed August 19, 1952); salts of monoamides of terephthalic acid of the type formula

wherein R is a long-chain aliphatic group such as tetradecyl, hexadecyl or octadecyl and M is the hydrogen equivalent of a metal, e.g., sodium or lithium; and mixtures of amic acid salts such as lithium hexadecyl adipamate and dibasic acid salts such as lithium adipamate (see Dixon U.S. Patent No. 2,756,213, entitled "Amate-Dicarboxylate-Thickened Grease," filed August 19, 1952).

Preferably, the compounds of the present invention are employed in high temperature greases, by which is meant greases having dropping points of not less than about 350° F. (as determined by the ASTM D566-42 method), and which remain unctuous and do not become hard or brittle at 350° F. The inhibitors of the present invention are most advantageous in high temperature greases and in high temperature service because of their low volatility, their stability and their effectiveness at high temperature.

I claim:

1. A compound of the formula:

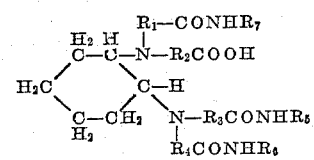

wherein $R_1$, $R_2$, $R_3$, and $R_4$ are alkylene radicals containing from 1 to 2 carbon atoms; and $R_5$, $R_6$ and $R_7$ are alkyl radicals containing from 12 to 22 carbon atoms.

2. The compound, trioctadecylamide of cyclohexanediaminetetraacetic acid, wherein said amine groups are in ortho positions on the cyclohexane radical.

References Cited in the file of this patent

UNITED STATES PATENTS 2,519,708    Schalpfer et al. _____ Aug. 22, 1950